June 3, 1930.   M. O. BRENNAN ET AL   1,761,189
MACHINE FOR APPLYING FLEXIBLE CASINGS TO MAGAZINES
Filed Feb. 23, 1929    3 Sheets-Sheet 1

June 3, 1930.  M. O. BRENNAN ET AL  1,761,189
MACHINE FOR APPLYING FLEXIBLE CASINGS TO MAGAZINES
Filed Feb. 23, 1929   3 Sheets-Sheet 3

Patented June 3, 1930.

1,761,189

UNITED STATES PATENT OFFICE

MARK O. BRENNAN AND GUSTAVE SCHULER, OF CHICAGO, ILLINOIS, ASSIGNORS TO SWIFT AND COMPANY, OF CHICAGO, ILLINOIS, A CORPORATION OF ILLINOIS

MACHINE FOR APPLYING FLEXIBLE CASINGS TO MAGAZINES

Application filed February 23, 1929. Serial No. 341,961.

This invention relates particularly to machines for applying a flexible casing to the magazine of a meat covering machine.

The co-pending application of Mark O. Brennan, Serial No. 258,636, relating to methods and means for wrapping food products, shows a device including a tubular magazine on the outer surface of which is stored a supply of tubular knitted fabric which is applied as a casing to cuts of meat as they emerge from the interior of the magazine.

Heretofore, the application of the casing material to the tubular magazine was a hand operation which consumed considerable time and was therefore expensive.

The main objects of this invention are to provide an improved machine for applying the tubular casing material to the magazine; to provide a machine of this kind having improved means for supporting the magazine; to provide improved mechanism for feeding the casing material from a roll to the magazine; to provide improved means for tightly packing the casing material in folds upon the magazine; to provide supporting means of this kind which will move to shift the position of the magazine when the pressure exerted by said packing means exceeds a predetermined amount; to provide improved operating mechanism for actuating said feeding mechanism and packing means; and to provide improved means for automatically stopping said operating mechanism when said supporting means reaches a predetermined position.

An illustrative embodiment of this invention is shown in the accompanying drawings, wherein:—

Figure 1:
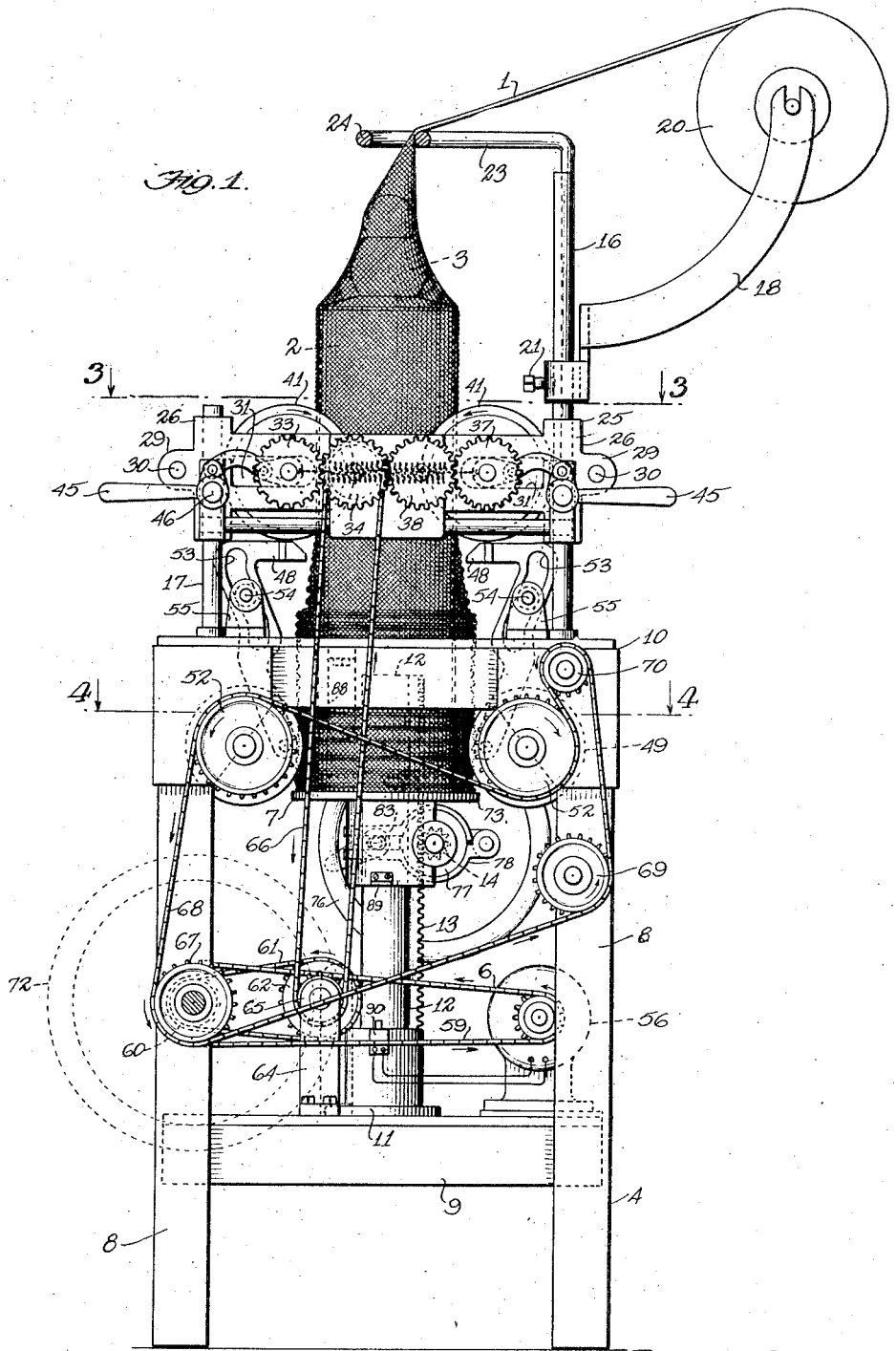
Figure 1 is a side elevation of a machine to which this invention is applied, showing a magazine supported thereon and a flexible casing applied to the magazine, the hand wheel being shown in dotted outline.
Figure 2:
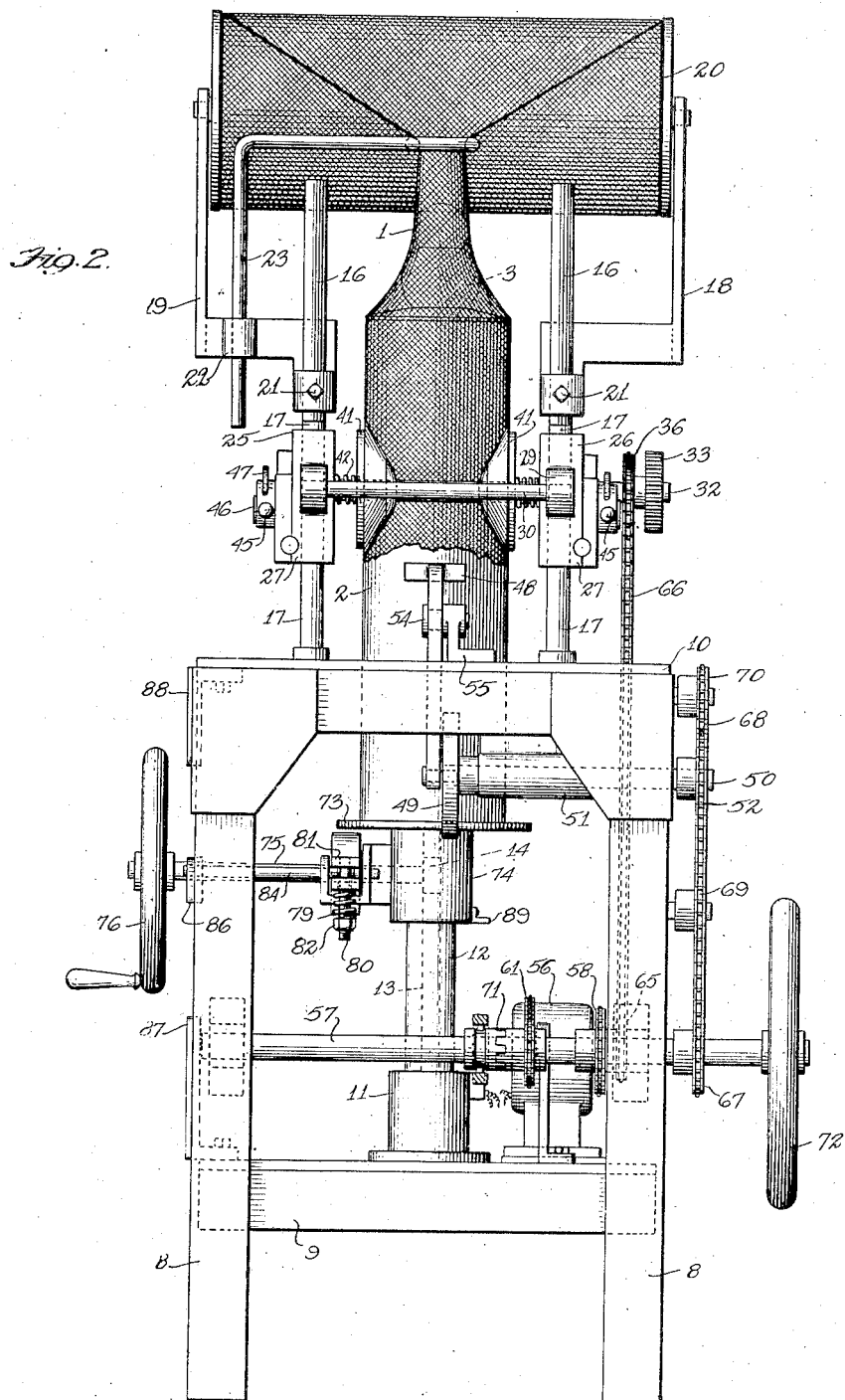
Fig. 2 is a side elevation, taken from the left of Fig. 1.
Figure 3:
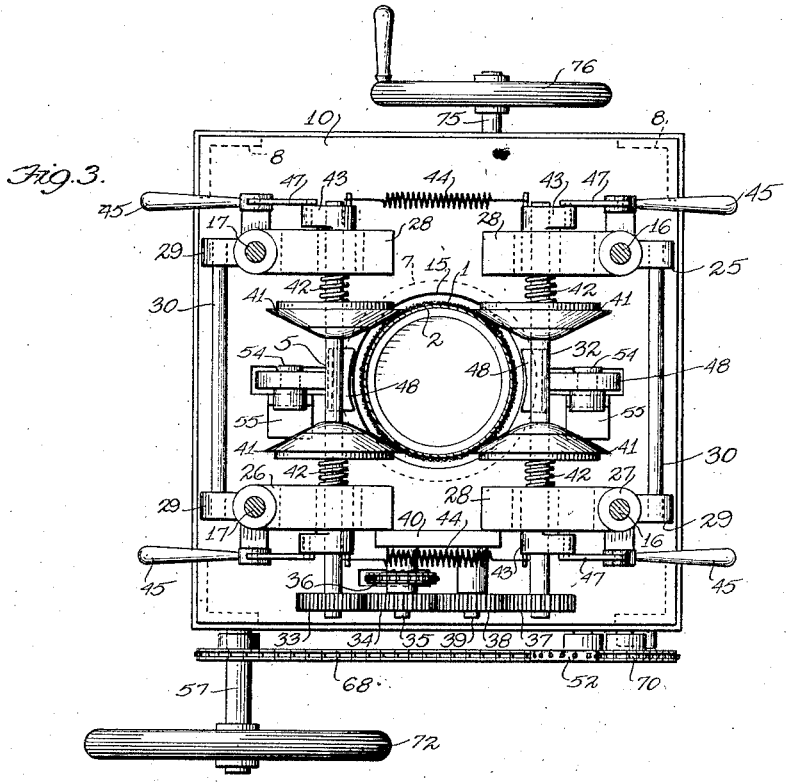
Fig. 3 is a horizontal section, taken on the line 3—3 of Fig. 1.
Figure 4:
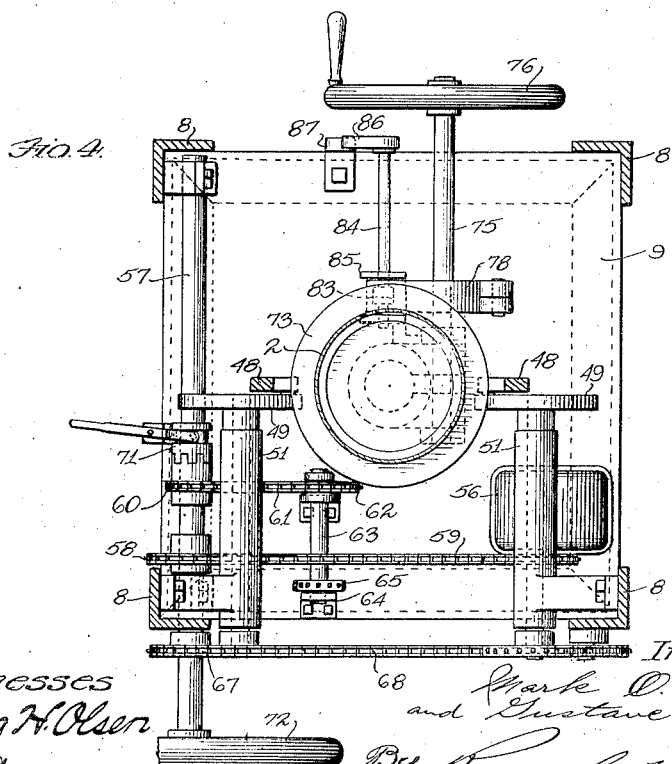
Fig. 4 is a horizontal section, taken on the line 4—4 of Fig. 1.

The improved machine herein shown and described is adapted to apply tubular flexible casing material 1 to a magazine 2.

The casing material commonly employed in wrapping cuts of meat consists of a knitted fabric known as stockinette.

The magazine 2 herein shown, is similar to the magazine illustrated in the aforementioned Brennan application. It is tubular so as to permit the cuts of meat to be passed therethrough in the process of applying the casings thereto. In order to facilitate the loading of the magazine with the casing material, a removable cap 3 is provided to fit over one end of the magazine. The cap 3 is removed, when the loaded magazine is taken from the improved machine.

In the form shown, the improved machine includes a frame 4, on which is mounted a feeding mechanism 5 actuated by operating means 6 for applying the casing material to a magazine carrried by an improved vertically movable support 7.

The frame 4 herein shown comprises legs 8, consisting of upright angle bars, which support a base 9 and a top 10.

Mounted on the base 9, is a socket 11, in which is rigidly secured a vertical post 12, disposed in substantially the center of the frame 4 and extending upwardly to a point adjacent the top 10. Fixed on one side of the post 12, is a vertical rack 13, which meshes with a pinion 14 carrried by the support 7, as hereinafter described.

Formed in the top 10, is a centrally located opening 15, which is arranged to receive the magazine and to permit the magazine to move downwardly under the action of the feeding mechanism, as hereinafter described.

Mounted on the top 10, are two pairs of posts 16 and 17. Supported on the posts 16, is a pair of brackets 18 and 19 which support a roll 20 containing a supply of the casing material. The brackets 18 and 19 are adjustably secured to the posts 16 by set screws 21.

Formed in the bracket 19, is a bearing 22, in which is supported a rod 23 having its upper end bent to form a guide loop 24, through which the casing material is fed.

Mounted on the posts 16 and 17, is a frame 25 for supporting a portion of the feeding mechanism 5.

The frame 25 comprises two pairs of bearing members 26 provided with tubular shanks 27, embracing the posts, and laterally extending arms 28. Integrally formed on the shanks 27, are lugs 29 for attachment to a pair of substantially parallel tie rods 30 which are arranged to unite the two bearing members 26 of each pair.

Formed in the arms 28, are horizontally disposed slots 31, in which is seated a pair of driven shafts 32.

Fixed on one end of one of the shafts 32, is a gear 33, which meshes with a drive gear 34 fixed on a stud shaft 35, on which is mounted a sprocket 36 driven by the operating means 6.

Fixed on the other shaft 32, is a gear 37 which is driven by the gear 34 through an idler 38 journaled on a stud shaft 39. The shafts 35 and 39 are supported on a plate 40 secured to two of the bearing members 26.

Splined to the shafts 32, are two pairs of conical feed rollers 41, which are arranged so as to be adapted to frictionally grip the casing material to feed it downwardly onto the magazine. The feed rollers 41 are urged inwardly into engagement with the casing material by springs 42 embracing the shafts 32 and bearing between the rollers 41 and members 26.

Fixed on the shafts 32 adjacent the ends thereof, are arms 43 having pins 44 mounted thereon for attachment to a pair of springs 44, which are arranged to normally urge the two shafts 32 inwardly.

In order to permit the magazine to be inserted into the machine and removed therefrom, handles 45 are provided for manually moving the shafts 32 outwardly against the action of the springs 44 to retract the feed rollers 41.

The handles 45 are pivotally secured to the bearing members 26 by pins 46 and are connected to the arms 43 by links 47.

Located below the feed rollers, is a packing mechanism arranged to grip the casing material and to pack it tightly in folds, as shown in Fig. 1.

In the form shown, the packing mechanism includes a pair of claws 48 having their lower ends pivotally secured to a pair of crank members 49 fixed on shafts 50, which are journaled in bearings 51 of the frame 4. Sprockets 52 are fixed on the outer ends of the shafts 50 and are driven by the operating means 6, as hereinafter described.

Formed in the claws 48, are slots 53, which provide guideways for receiving guide pins 54 mounted on brackets 55, secured to the top 10. With this improved arrangement of parts, the claws are held in firm contact with the casing material during their downward stroke and are held out of contact therewith on the upward stroke.

In the construction illustrated, the operating means 6 includes a suitable motor 56 mounted on the base 9 and arranged to drive a shaft 57 having a sprocket 58, which is connected to the motor by a chain 59.

Also fixed on the shaft 57, is a sprocket 60 engaging a chain 61, which drives a sprocket 62 fixed on a shaft 63, which is journaled in brackets 64 mounted on the base 9. The shaft 63 also has a sprocket 65, which is connected to the sprocket 36 by a chain 66 for driving the feed rollers 41.

Mounted on the shaft 57, is a sprocket 67, which engages a chain 68 arranged to drive the packing claws 48 through the sprockets 52. The chain 68 engages the sprockets 67 and 52 in the manner shown in Fig. 1 and also engages a pair of idlers 69 and 70 journaled on the frame 4.

The shaft 57 includes a clutch 71 adapted to control the operation of the machine. Mounted on one end of the shaft 57 is a hand wheel 72.

In the embodiment shown, the support 7 includes a table 73 secured to a sleeve 74, which slidably embraces the post 12 to permit the support to move downwardly under the pressure of the claws 48 when a certain quantity of material has been accumulated in folds on the magazine.

Journaled in the sleeve 74, is a shaft 75 on which the pinion 14 is fixed. The outer end of the shaft 75 is provided with a hand wheel 76, whereby the support may be manually raised to its initial position.

Fixed on the shaft 75, is a brake drum 77 which is embraced by a brake band 78 arranged to yieldingly resist the downward movement of the support 7. The band 78 is urged into frictional engagement with the drum 77 by a spring 79 embracing a bolt 80 which is arranged to span the space between the ends 81 of the band. The tension of the spring 79 may be adjusted by means of a nut 82 mounted on the lower end of the bolt 80.

In order to permit the support 7 to move freely when it is being raised to initial position by the hand wheel 76, means is provided for releasing the brake.

The releasing means includes a cam 83 located between the spaced ends 81 of the brake band and adapted to be turned into position for spreading the band. The cam 83 is fixed on a shaft 84 journaled in a bracket 85, which is mounted on the sleeve 74.

Mounted on the outer end of the shaft 84, is an arm 86 arranged to engage a pair of trippers 87 and 88 mounted respectively on the bottom 9 and top 10, for actuating the cam 83 at both limits of the movement of the support 7.

Mounted on the sleeve 74, is a finger 89 adapted to operate a switch 90 located on the socket 11 for stopping the machine automatically when the support 7 reaches its lowermost position.

In operation, the support 7 is raised to its uppermost position and the handles 45 are shifted downwardly to retract the rollers 41. An empty magazine 2 is then placed on the table 73 and the casing material is placed over the cap 3 and drawn downwardly by hand to a position adjacent the rollers 41.

The handles 45 are then raised to release the feed rollers. The operating means is then started so as to actuate the feeding mechanism. The feed rollers 41 feed the casing material downwardly and the claws 48 tightly pack it in folds.

Under the pressure of the claws 48, the support 7 and magazine move downwardly step-by-step until the switch 90 is actuated for stopping the motor.

When the arm 86 strikes the tripper 87, the cam 83 is actuated to release the brake so as to permit the support 7 to be raised by the hand wheel 76. When the arm 86 strikes the tripper 88, the cam 83 is restored to its ineffective position so as to permit the brake band to again grip the drum 77.

Although but one specific embodiment of this invention has been herein shown and described, it will be understood that numerous details of the construction shown may be altered or omitted without departing from the spirit of this invention as defined by the following claims.

We claim:

1. A device of the class described comprising a support for a magazine, mechanism for feeding a flexible tubular casing onto said magazine, and reciprocable means for packing said casing in folds upon said magazine.

2. A device of the class described comprising a support for a magazine, a packer adapted to feed a flexible tubular casing onto said magazine, said support being movable to shift the magazine under the pressure of said packer, and means yieldingly resisting the movement of said support.

3. A device of the class described comprising a support for a magazine, mechanism for feeding a flexible tubular casing onto said magazine, said support being movable to shift the magazine relative to said mechanism, operating means for actuating said feeding mechanism, and means arranged to render said operating means ineffective when said support reaches a predetermined position.

4. A device of the class described comprising a support adapted to hold a magazine in position to receive a flexible tubular casing, a pair of claws located on respectively opposite sides of said support and adapted to pack the casing in folds on the magazine, and means for actuating said claws.

5. A device of the class described comprising a frame, a support movably mounted on said frame for holding a magazine adapted to receive a casing material, a plurality of feed rollers arranged to feed the casing material onto the magazine, a packer arranged to pack the material in folds beyond said feed rollers, and means for actuating said feed rollers and packer.

6. A device of the class described comprising a frame, a support mounted in said frame for holding a magazine in a vertical position to receive a casing material, a plurality of feed rollers arranged to feed the material onto the magazine, a packer adapted to grip the material below said feed rollers for packing it in folds on the magazine, said support being movable vertically to adjust the magazine relative to said rollers and packer, and means for actuating said rollers and packer.

7. A device of the class described comprising a movable support adapted to hold a magazine for receiving a flexible casing material, a packer adapted to pack the material in folds on the magazine, said support being adapted to yield for shifting the magazine when a predetermined amount of folded material has been accumulated by said packer, and means for actuating said packer.

8. A device of the class described comprising a support adapted to hold a magazine for receiving a casing material, a packer arranged to pack the material onto the magazine, said support being movable to shift the magazine relative to said packer, means yieldingly resisting the movement of said support, and mechanism adapted to render said means ineffective so as to permit said support to be freely shiftable.

9. A device of the class described comprising a support adapted to hold a magazine for receiving a casing material, a packer arranged to pack the material onto the magazine, said support being movable in one direction under the action of said packer, means yieldingly resisting the movement of said support, and mechanism adapted to render said means ineffective when said support reaches a predetermined position so as to permit said support to be freely shiftable in the opposite direction.

10. A device of the class described comprising a frame, a support mounted on said frame for holding a magazine in a vertical position to receive a casing material, a packer arranged to pack the material in folds on the magazine, said support being movable vertically to shift the magazine relative to said packer, means for yieldingly resisting the downward movement of said support, and mechanism for rendering said means ineffective when said support reaches the lower limit of its movement.

11. A device of the class described comprising a frame, a support mounted on said frame for holding a magazine in a vertical position to receive a casing material, a packer arranged to pack the material in folds on the magazine, said support being movable vertically to shift the magazine relative to said packer, means for yieldingly resisting the downward movement of said support, mechanism for rendering said means ineffective when said support reaches the lower limit of its movement, and means for resetting said resisting means when said support reaches the upper limit of its movement.

12. A device of the class described comprising a frame, a vertical post on said frame, a rack on said post, a support movably mounted on said post for holding a magazine adapted to receive a casing material, a pinion on said support meshing with said rack, an operating shaft for said pinion, a packer arranged to pack the material in folds on the magazine, said support being movable downwardly under the pressure of said packer, and a brake arranged to resist rotation of said shaft.

13. A device of the class described comprising a frame, a vertical post on said frame, a rack on said post, a support movably mounted on said post for holding a magazine adapted to receive a casing material, a pinion on said support meshing with said rack, an operating shaft for said pinion, a packer arranged to pack the material in folds on the magazine, said support being movable downwardly under the pressure of said packer, a brake arranged to resist rotation of said shaft, and mechanism for releasing said brake when said support reaches a predetermined position.

14. A device of the class described comprising a frame, a support on said frame for holding a magazine to receive a casing material, means on said frame for holding a supply of the casing material, a plurality of feed rollers mounted on said frame for feeding the material onto the magazine, said rollers being shiftable toward and away from the magazine, a packer arranged to grip the material below said rollers and to pack it in folds, said support being movable vertically to shift the position of the magazine relative to said packer and rollers, means for yieldingly resisting the movement of said support, and operating means for actuating said rollers and packer.

Signed at Chicago this 20th day of February, 1929.

MARK O. BRENNAN.
GUSTAVE SCHULER.